United States Patent [19]

Sobol

[11] Patent Number: 5,542,599
[45] Date of Patent: Aug. 6, 1996

[54] BIODEGRADABLE THERMALLY INSULATED BEVERAGE CUP

[76] Inventor: Ronald E. Sobol, 5015 W. Sahara, Apt. 125-162, Las Vegas, Nev. 89102

[21] Appl. No.: 511,746

[22] Filed: Aug. 7, 1995

[51] Int. Cl.⁶ .................... B65D 5/56; B65D 3/22
[52] U.S. Cl. .................. 229/403; 220/445; 229/4.5
[58] Field of Search .................. 229/3.1, 4.5, 400, 229/403; 220/441, 443, 445

[56] References Cited

U.S. PATENT DOCUMENTS

| | | | |
|---|---|---|---|
| 1,771,765 | 7/1930 | Benson | 229/4.5 |
| 2,266,828 | 12/1941 | Sykes | 229/403 |
| 2,563,352 | 5/1951 | Morse | 229/403 |
| 3,580,468 | 5/1971 | McDevitt | 229/400 |
| 3,908,523 | 9/1975 | Shikaya | 229/403 |
| 4,715,527 | 12/1987 | Tsuzuki et al. | 229/3.1 |
| 4,993,580 | 2/1991 | Smith | 220/441 |
| 5,092,485 | 3/1992 | Lee | 229/403 |
| 5,205,473 | 4/1993 | Coffin, Sr. | 220/441 |
| 5,226,585 | 7/1993 | Varano | 229/403 |
| 5,363,982 | 11/1994 | Sadlier | 220/441 |

OTHER PUBLICATIONS

The Wiley Encyclopedia of Packaging Technology (WEPT), John Wiley & Sons, pp. 66, 67 (1986).

*Primary Examiner*—Gary E. Elkins
*Attorney, Agent, or Firm*—Barry R. Blaker

[57] ABSTRACT

Disclosed herein is a beverage cup which is composed essentially of biodegradable paper elements and is thermally insulated to both preserve the thermal state of beverages contained therein and to render the cup comfortable in its use.

11 Claims, 2 Drawing Sheets

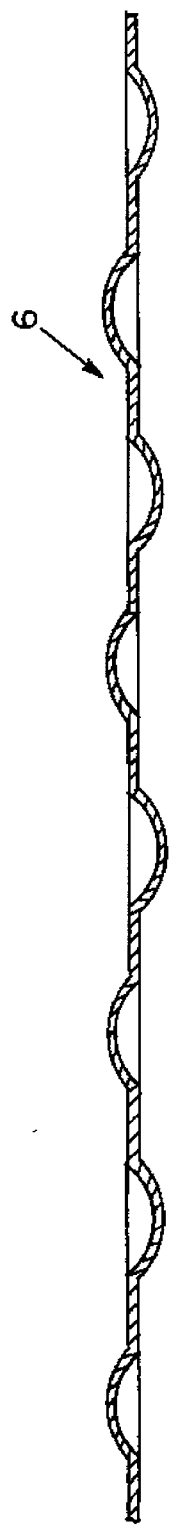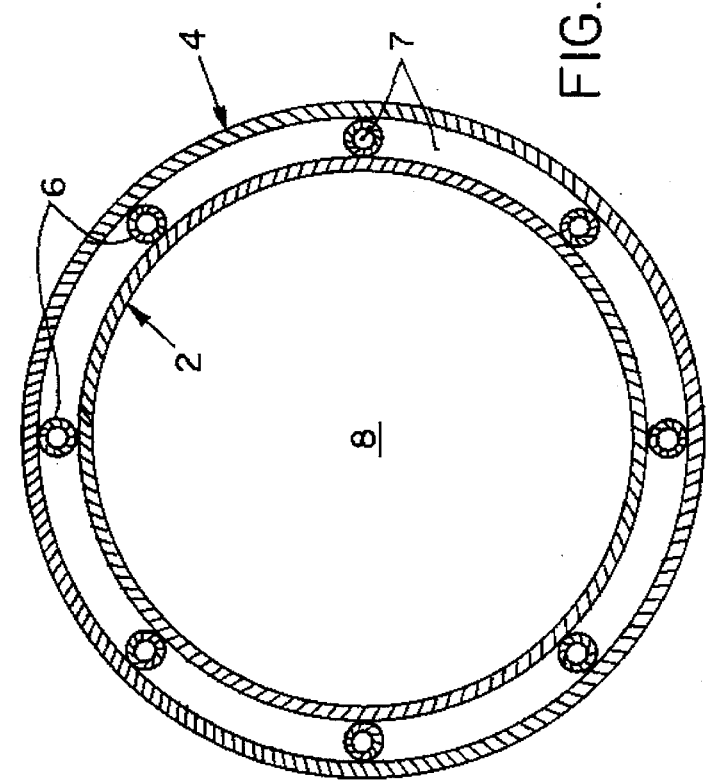

BIODEGRADABLE THERMALLY INSULATED BEVERAGE CUP

FIELD OF THE INVENTION

The present invention relates broadly to thermally insulated beverage cups and is more particularly concerned with a thermally insulated drinking cup construction which is environmentally friendly and is susceptible of recycling treatment thereof.

BACKGROUND OF THE INVENTION

Hot and cold beverage cups composed of molded synthetic polymer foams are well known. Such synthetic polymer foam cups have been found to constitute a technically effective means by which to contain hot or cold drinks because the synthetic polymer foam materials utilized in their manufacture, such as polystyrene foam, are effective thermal insulators and do not ordinarily introduce foreign tastes into the beverages contained therein. Their effective thermal insulation value serves well in preserving the thermal state of the beverages contained therein and, in addition, in preventing the exterior of the cup from becoming uncomfortably cold or hot to the user. However, such synthetic polymer foam cups do suffer from a major and widely recognized deficiency; namely, they are not biodegradable and thus represent significant environmental and waste disposal problems after use. In one aspect extensive use of such cups can result in serious cosmetically unattractive blighting of the environment when they are improperly discarded by a careless or uncaring public. In another aspect, even if properly discarded by a careful public into proper waste receptacles, such polymer foam cups continue to pose a waste disposal problem in that, if improperly incinerated, such cups can release styrene, soot and other noxious by-product materials into the atmosphere. Indeed, the environmental and waste disposal problems posed by discarded polystyrene foam cups have become so apparent that various jurisdictions have either banned their by statute or legislative fiat or, alternatively, the retail food purveyors of a particular geographic jursidiction have agreed amongst themselves to avoid their use. One example of this last-mentioned response to the environmental problems posed by the demonstrated unrestrained disposal of the public's synthetic polymer foam drinking cups presently exists on the island of Martha's Vineyard, Dukes County, Mass. There, restaurants, convenience stores, cafeterias and other retail purveyors serving the "take-out" food trade have agreed amongst themselves, without express legislative action by governmental political bodies, to forego the use of synthetic polymer foam cups in their retail packaging of beverages. The beneficial effects of the implementation of this agreement have been essentially immediately apparent, said effects being a palpable and substantial reduction in the cosmetically unattractive fouling of the land and waters of this island with discarded non-biodegradable polymer foam drinking cups and/or the broken remnants thereof and, of course, a substantial reduction in the problems associated with effectuating environmentally safe disposal of such polymer foam cup wares.

On the other hand, more environmentally acceptable beverage cups composed of biodegradable paper or paperboard elements in which the principal constitutent is a cellulosic or vegetable fiber have also been long known. The presently known paper beverage cups are single layer structures which are rendered adequately waterproof to serve their temporary beverage storage function by being internally coated or impregnated with a thin coating of a paraffin or a microcrystalline wax (cold beverages) or with a thin coating of a synthetic high polymer having a high melting point, such as polypropylene or polyethylene (hot beverages). The principal operational problem experienced with such single layer paper beverage cups, however, resides in the fact that their thermal insulation value is low. Thus, heat exchange between the exterior environment and a beverage contained within such presently known paper cups is relatively rapid. In the case of cold beverages this means that heat is rapidly extracted from the relatively warmer surrounding environment (which includes the hand of the user in contact with the exterior of the cup) and into the cold beverage, thereby quickly warming the beverage, often to the extent that it becomes unpalatable before it is fully consumed. Too, on occasion, the exterior of the cup may become uncomfortably cold to the user. On the other hand, in the case of hot beverage contents, such as soup, coffee, tea or hot chocolate, heat is rapidly extracted therefrom through the cup and is delivered into the cooler exterior environment which also includes the contacting hand of the user. Thus, not only is the temperature of the contained hot beverage undesirably and rapidly reduced by this heat exchange, sometimes to the point of unpalatability of the contents, but also the temperature of the exterior of the cup usually becomes uncomfortably hot. Where this last occurs, it is common human behavior that the user will often respond protectively to such discomfort by repetitively switching the cup from hand to hand throughout its use. Such a protective manipulative technique is obviously bothersome and gives rise to increased opportunities for accidental spillage of the hot beverage contents.

As a partially successful response to the problem of the discomfort commonly encountered in the handling of prior art paper beverage cups it is also known to provide such cups, particularly those specifically directed to the containment of hot beverages, with a fold-out paper handle secured to the exterior thereof. The fold-out feature of the handle is necessary in order to preserve stackability of the cups, such that they may be nested one within the other to form a compact stack for storage, packaging, shipping and/or dispensing purposes. While such a fold-out handle does somewhat reduce the area of contact between the exterior of the cup and the hand of the user the need to establish a lesser, but still substantial, contact with one or more fingers of the user's hand generally remains. For instance, the fold-out type paper handle when deployed usually defines an opening through which a finger of the user's hand is intended to be received. Generally, at least a portion of the dorsal surface of the finger received into the handle's opening finds itself in contact with the excessively hot or cold exterior surface of the cup. Too, in manipulating such a paper cup for drinking purposes, it is usually found that at least some additional support by other finger(s) of the hand is needed, particularly so when the cup is freshly filled to capacity and thus is at its heaviest and the beverage contained therein is at its hottest (or coldest) temperature. Finally, such cups are essentially no better in preserving the thermal state of their beverage contents than their non-handled counterparts.

In accordance with the present invention the foregoing problems relating to the polymeric foam and paper beverage cups of the prior art have been successfully addressed.

OBJECTS OF THE INVENTION

It is a principal object of the invention to provide a novel thermally insulated, paper cup construction.

It is another object of the invention to provide an environmentally friendly thermally insulated cup construction composed essentially of biodegradable paper elements.

It is another object of the invention to provide a thermally insulated cup construction composed essentially of recyclable paper elements and which construction, if disposed of in an environmentally correct manner following use thereof, may be readily recycled using known recycle techniques to provide usable recycled paper pulp.

It is yet another object of the invention to provide a thermally insulated paper cup construction wherein the temperature of that portion of the exterior surface thereof which contacts the hand of the user remains comfortable to the touch during use thereof.

It is still another object of the invention to provide a thermally insulated paper cup construction which, if inadvertently and/or carelessly disposed of into the ambient natural environment, will ultimately biodegrade into environmentally safe and cosmetically acceptable by-products.

It is still another object of the invention to provide a thermally insulated paper cup construction which is physically stronger and stiffer than paper cups of the prior art.

Other objects and advantages of the present invention will, in part, be obvious and will, in part appear hereinafter.

SUMMARY OF THE INVENTION

In accordance with the present invention there is provided a thermally insulated, beverage cup construction composed of a number of adhesively joined paper elements. The paper elements of the cup construction of the invention are biodegradable in nature and comprise: an inner side wall; an outer side wall spaced exteriorly of said inner side wall, spacer means interposed between said inner and outer side walls and defining a plurality of thermally insulative spaces therebetween, said spacer means being adhesively secured to said inner and outer side walls and maintaining same in said spaced apart relationship; a fluid tight bottom closure of said inner side wall; and a rim defined by the upper margin of said said inner side wall.

BRIEF DESCRIPTION OF THE DRAWINGS

FIG. 4 hereof is a schematic, diagrammatic, sectional view of an embossed paper suitable for use as the spacer means of the invention.

FIG. 5 hereof is a schematic, diagrammatic, sectional top view of another embodiment of the invention and wherein showing an an alternative form of spacer means utilizable therein.

DESCRIPTION OF PREFERRED EMBODIMENTS

Figure 2:
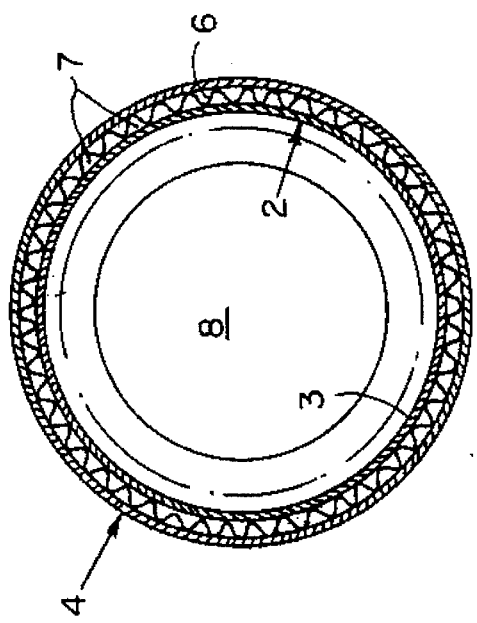
FIG. 2 hereof is a schematic, diagrammatic, sectional top view of the embodiment of the cup construction of the invention shown in FIG. 1, taken through lines A–A' thereof.

The thermally insulated cup construction of the invention comprises a number of adhesively joined paper elements. As utilized herein, the term "paper" refers generally to sheet form materials which are produced by fine wire screening of an aqueous suspension or pulp wherein the disperse phase of said suspension or pulp is at least predominantly composed of biodegradable vegetable fibers. The papers of particular interest are those produced from suspensions or pulps wherein the disperse phase component thereof is at least predominantly of wood, rag and/or recycled paper fibers. Included within the ambit of the term are paperboards such as bristol board, boxboard, cardboard, pasteboard and the like.

Referring now to FIGS. 1–5 hereof, wherein like reference numerals refer to like elements, the cup construction 1 of the invention broadly comprises: an inner side wall 2; an outer side wall 4 spaced exteriorly of said inner side wall 2; spacer means 6 interposed in the space between said inner and outer side walls 2 and 4 and being adhesively secured thereto, said spacer means defining a plurality of thermally insulative spaces 7 therebetween; a bottom closure 8 adhesively secured to and forming a fluid tight closure with the bottom of said inner side wall 2 and a rim 12 defined by the upper margin of said inner side wall 2

At least the interior surfaces 3 and 9 of the inner side wall 2 and bottom closure 8 of the cup construction are appropriately coated or impregnated so as to waterproof those elements of the cup construction which are directly and continuously exposed to the liquid beverage contents during use thereof. While the paraffin and microcrystalline wax paper coatings and/or impregnations mentioned previously with respect to known prior art paper cups designed for use with cold beverages can be found suitable for use in the present invention, I much prefer that said interior surfaces 3 and 9 be provided with a thin, in other words from about 0.00025 to about 0.002 inch in thickness, synthetic thermoplastic polymer coating, such as polyvinylidene chloride, polyethylene or polypropylene. In this, I prefer that said thermoplastic coating be in the nature of a polyolefin, particularly polyethylene. Various solvent, latex and extrusion coating techniques for the application of such thin thermoplastic coatings to paper substrates are well known and no detailed discussion thereof is required herein. My preferences in this regard are based upon the following considerations: (1) the waterproofing afforded paper substrates by such synthetic thermoplastically coated surfaces 3 and 9 generally befits the cup construction for use with both hot and cold beverages, and (2) said thin thermoplastic coatings of these paper elements of the invention can often find additional use as thermoplastic adhesives and/or sealants whereby fluid tight sealing and/or physical adherence of one or more of said coated paper elements of the invention to one or more of the other coated or uncoated paper elements thereof may be had, thus avoiding the need for use of separate and distinct adhesives and simplifying fabrication techniques. As an example of this last-mentioned feature, for instance, reference is made to FIG. 1 wherein there is depicted a preferred embodiment of the invention wherein the rim 12 forms an essentially fluid tight upper closure 10 of the space between the inner and outer side walls 2 and 4. Said closure 10 is formed from an extended upper margin 11 of the thermoplastic polymer coated inner side wall 2. This extended upper margin 11 of the inner side wall 2 is rolled outwardly and downwardly to below the upper margin of the outer side wall 4, and the edge of said margin 11 tucked upwardly so as to form a smooth rolled rim 12 about the circumference of the cup and to place the plastic coated surface of said edge into contact with the exterior surface 5 of the outer side wall 4. Said edge is then heated sufficiently so as to flux the thermoplastic coating thereof and to thereby adhesively secure the rolled rim 12 to the exterior of the outer side wall 4. Of course, where the above-described essentially fluid tight closure 10 is not desired, the upper margin of the outer side-wall 4 can be located below the level of the rim 12 construction and the rim 12 formed simply by rolling of the extended upper margin 11 of the inner side wall 2 upon itself, rather than upon the exterior surface 5 of the outer side wall 4. Thus, construction of the cup is somewhat simplified.

Figure 3:
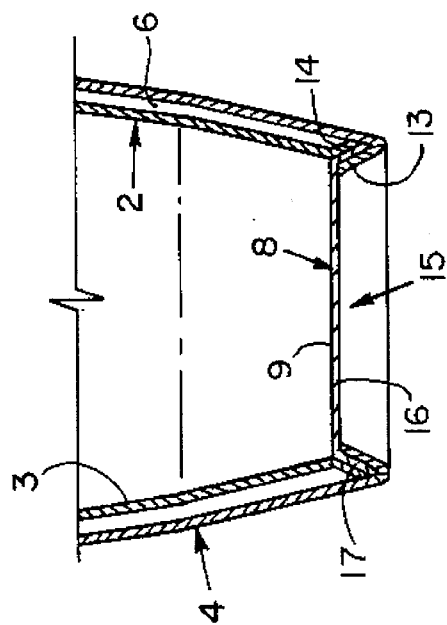
FIG. 3 hereof is a schematic, diagrammatic, sectional side view of the bottom portion of the embodiment of the cup construction of the invention shown in FIG. 1, taken through lines B–B' thereof.
Figure 1:
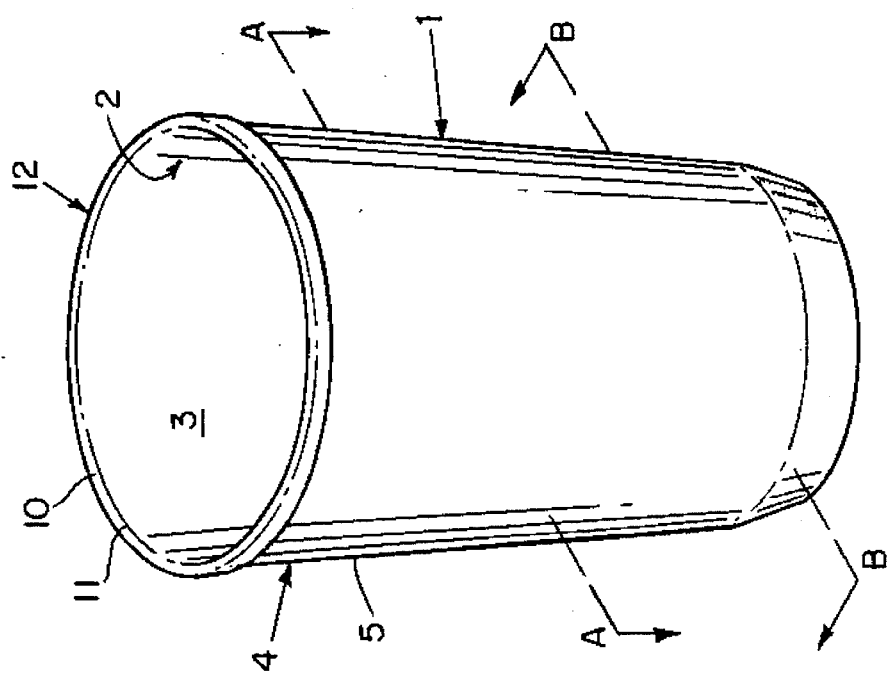
FIG. 1 hereof is a schematic, diagrammatic, perspective view of an embodiment of the cup construction of the invention.

Referring now to FIG. 3, bottom closure 8 is provided in the general form of a truncated conical plug 15 having a disk shaped floor 16, a perimeter flange 17 extending downwardly from said floor 16 and the interior surface 9 thereof being coated with a thermoplastic. The open bottom end of the cup defined by the side walls 2 and 4 is suitably beveled to accomodate the flange 17 of said plug 15 in surface engagement therewith and, once this physical association has been mechanically achieved, the flange 17 can be thermoplastically bonded and sealed to the bottom edge of at least the inner side wall 2, whereby the respective contacting thermoplastic coatings of the interior surfaces 9 and 3 of the bottom closure 8 and the inner side wall 2 are thermoplastically bonded together to provide the fluid tight bottom closure 8 of the cup construction. Desirably, said flange 17 is thermoplastically bonded throughout its bearing surface to the inner and outer side walls 2 and 4. In order to further enhance the security of attachment of the bottom closure 8 it is further desirable that the outer side wall 4 be provided with an integral bottom extension 13 extending downwardly beyond the intended lower margin thereof and that said extension 13 be inwardly and upwardly folded about the bottom rim 14 of the cup and adhesively bonded to the exterior of the flange 17.

The spacing between the inner side wall 2 and the outer side wall 4 of the cup construction of the invention is, in general, not critical and is subject to considerable variation. A spacing of as little as, say, about $1/32$ inch can be found useful in attaining the thermal insulation benefits of the invention although such a small spacing may pose fabrication difficulties under mass production conditions. Accordingly, I generally prefer that the spacing between the inner and outer side walls 2 and 4 be at least about $1/16$ inch. On the other hand it is desirable that the cup construction of the invention be sufficiently compact as to be stackable in useful numbers for use by retail beverage purveyors. Accordingly, with this last-mentioned characteristic in mind I further prefer that said spacing not exceed about $3/16$ inch and, of greatest preference, will reside within the range of from about $1/16$ and about $1/8$ inch.

The side walls 2 and 4 are maintained in spaced apart relationship by spacer means 6 which is adhesively secured to each of said side walls and which defines a plurality of thermally insulative spaces 7 therebetween. In addition to its physical role of maintaining the spacing between the side walls 2 and 4 and its further function in defining a plurality of insulative spaces 7, said spacer means also serves to significantly strengthen the cup construction of the invention. Bearing these functions in mind, therefore, suitable spacer means 6 can taken many specific forms. In the embodiment of the invention of FIGS. 1 through 3, said spacer means 6 is a corrugated paper element, the corrugations thereof being generally oriented lengthwise of the cup. I generally prefer this form of spacer means due to its simplicity and because the apices of the corrugations establish only line contact with the side walls 2 and 4, thereby minimizing conductive heat exchange through the material of the cup. Other forms of spacer means 6 can also be found suitable, however. For instance, in FIG. 4 there is shown a spacer means 6 in the nature of a paper sheet which has been embossed from both sides with an array of positive and negative dimples. Said dimples, of course, establish point contact with the side walls 2 and 4 when interposed in the space therebetween. In FIG. 5 there is shown yet another suitable form of spacer means 6 which takes the form of a plurality of paper straws disposed longitudinally within and arranged equiangularly about the space defined between the side walls 2 and 4. In this embodiment, of course, the resulting thermally insulative spaces 7 are not only defined by the spaces existing between individual straws, but also by the bores of said individual straws.

While the present invention has been described hereinabove in connection with several preferred embodiments, many obvious variations and modifications will become apparent to those of skill in the art. For instance, the invention has been hereinbefore described with respect to certain preferred embodiments comprising spaced apart inner and outer side walls and spacer means interposed therebetween and adhesively secured to both side walls. However, if the practitioner of the invention is willing to compromise some measure of the theoretically available strength, thermal insulation and comfort benefits provided when both inner and outer side walls are present in favor of the advantage of a more simple construction while preserving the substantial comfort benefits afforded by the combination of the spacer means 6 taken in combination with the inner side wall 2, particularly with respect to the continuous corrugated or dimpled paper spacer constructions of FIGS. 1–3 or 4, then yet another useful embodiment of the invention can be achieved by eliminating from the cup construction, in part or altogether, the outer side wall 4 element thereof. Accordingly, it is intended that the invention be limited not by the specific disclosure herein, including the drawings, but only by the appended claims.

What is claimed is:

1. A thermally insulated beverage cup comfortable to handle and being composed essentially of biodegradable paper elements, said cup comprising:

an inner side wall element having upper and lower margins defining the upper rim and bottom margin, respectively, of said cup;

a continuously circumscribing spacer means element composed of dimpled paperboard and being adhesively secured to the exterior of said inner side wall element, at least a portion of the dimples of said spacer means element defining a plurality of thermally insulative spaces between said inner side wall element and said spacer means; and a fluid tight bottom closure of said inner side wall element.

2. The beverage cup of claim 1 wherein each of the surfaces of said inner side wall element and said bottom closure facing the interior of the cup comprises a thin thermoplastic coating thereover.

3. The beverage cup of claim 2 wherein said inner side wall element and said bottom closure comprises a thermoplastic bond formed between said thermoplastic coatings.

4. The beverage cup of claim 1 including an outer side wall element adhesively secured to said spacer means element, said outer side wall element thereby being spaced exteriorly of said inner side wall element by the spacer means element interposed therebetween.

5. The beverage cup of claim 4 wherein the spacing between said inner and outer side walls, resides within the range of from about $1/16$ inch to about $1/8$ inch.

6. The beverage cup of claim 1 wherein said upper rim is defined by an extended portion of the upper margin of said inner side wall element, said extended portion of said upper margin being rolled outwardly to form said upper rim.

7. The beverage cup of claim 4 wherein each of said inner side wall, bottom closure and outer side wall elements is composed of paperboard.

8. The beverage cup of claim 1 wherein said fluid tight bottom closure is defined by a plug substantially in the form of a truncated cone comprising a disk shaped floor element and an integral flange depending from the perimeter of said floor element, said flange element being adhesively secured in fluid tight relationship to at least the bottom margin of said inner side wall element.

9. The beverage cup of claim 7 wherein said fluid tight bottom closure is defined by a plug substantially in the form of a truncated cone comprising a disk shaped floor element and an integral flange depending from the perimeter of said floor element, said flange element being adhesively secured in fluid tight relationship to at least the bottom margin of said inner side wall element, and further, wherein said outer side wall element comprises an extended portion extending below said bottom margin of said inner side wall element, said extended portion of said outer side wall element being folded inwardly and upwardly over said flange element and being adhesively secured to said flange element.

10. The beverage cup of claim 1 wherein said dimples of said spacer means element are in line contact with said inner side wall element.

11. The beverage cup of claim 1 wherein said dimples of said spacer mean element are in point contact with said inner side wall element.

* * * * *